(12) United States Patent
Varale

(10) Patent No.: US 11,067,201 B2
(45) Date of Patent: Jul. 20, 2021

(54) POLE COLLAR FOR MOUNTING CABLES TO A SUPPORTING ELEMENT

(71) Applicant: Fi.Mo.Tec. S.p.A., Milan (IT)

(72) Inventor: Alberto Varale, Cologno Monzese (IT)

(*) Notice: Subject to any disclaimer, the term of this patent is extended or adjusted under 35 U.S.C. 154(b) by 0 days.

(21) Appl. No.: 16/792,300

(22) Filed: Feb. 17, 2020

(65) Prior Publication Data
US 2021/0108742 A1 Apr. 15, 2021

(30) Foreign Application Priority Data
Oct. 10, 2019 (IT) .................. 102019000018434

(51) Int. Cl.
| F16L 3/04 | (2006.01) |
| F16L 3/10 | (2006.01) |
| F16L 3/22 | (2006.01) |
| H02G 3/32 | (2006.01) |
| F16L 3/237 | (2006.01) |

(52) U.S. Cl.
CPC .............. F16L 3/04 (2013.01); F16L 3/105 (2013.01); F16L 3/221 (2013.01); H02G 3/32 (2013.01); F16L 3/237 (2013.01)

(58) Field of Classification Search
CPC ... F16L 3/04; F16L 3/105; F16L 3/221; F16L 3/237; H02G 3/32
USPC .................. 248/68.1, 74.1, 74.2, 74.4, 71
See application file for complete search history.

(56) References Cited

U.S. PATENT DOCUMENTS

| 2,470,814 | A | * | 5/1949 | Hain .................. F16L 3/221 248/68.1 |
| 2,550,001 | A | * | 4/1951 | Button ................ F16L 3/1091 248/49 |
| 2,671,625 | A | * | 3/1954 | Buckley .................. F16L 3/11 248/58 |
| 3,051,424 | A | * | 8/1962 | Duhamel ................ F16L 3/11 248/62 |
| 4,189,198 | A | * | 2/1980 | Reichman ............... H01R 4/64 439/100 |
| 4,557,447 | A |   | 12/1985 | Combe |
| 4,767,087 | A | * | 8/1988 | Combu .................... F16L 3/11 248/324 |
| 5,667,328 | A |   | 9/1997 | Hoefle |
| 7,325,776 | B2 | * | 2/2008 | Shibuya ............... F16L 3/1016 24/284 |
| 8,231,392 | B2 | * | 7/2012 | Garvin .................. H01R 4/643 439/100 |
| 2018/0172183 | A1 | * | 6/2018 | Joshi ..................... H02G 1/00 |

FOREIGN PATENT DOCUMENTS

| DE | 7622159 | 1/1977 |
| DE | 8322502 | 11/1983 |
| DE | 3807001 | 9/1989 |
| DE | 29511481 | 9/1995 |

(Continued)

OTHER PUBLICATIONS

Italian Patent and Trademark Office, Search Report, dated May 13, 2020 (Relevant portions are in English).

*Primary Examiner* — Muhammad Ijaz
(74) *Attorney, Agent, or Firm* — Themis Law

(57) ABSTRACT

A pole collar for mounting cables to a tubular supporting element includes at least one bracket having at least one pass-through hole defined therein, in combination with an insert or adapter having a threaded pass-through hole.

13 Claims, 9 Drawing Sheets

(56) References Cited

FOREIGN PATENT DOCUMENTS

| EP | 0908637 | 4/1999 |
|---|---|---|
| EP | 1750046 | 2/2007 |
| EP | 2239472 | 10/2010 |

\* cited by examiner

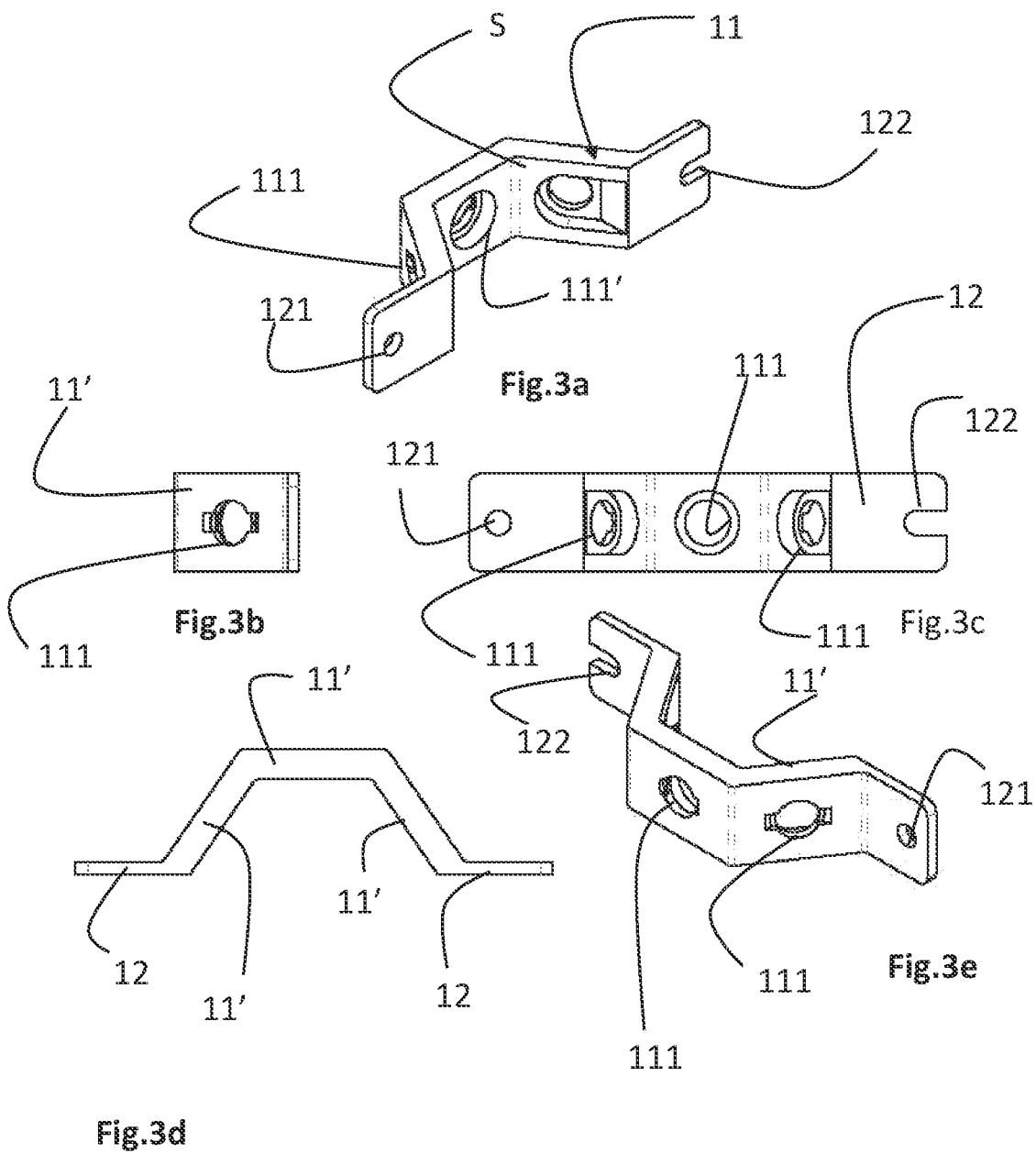

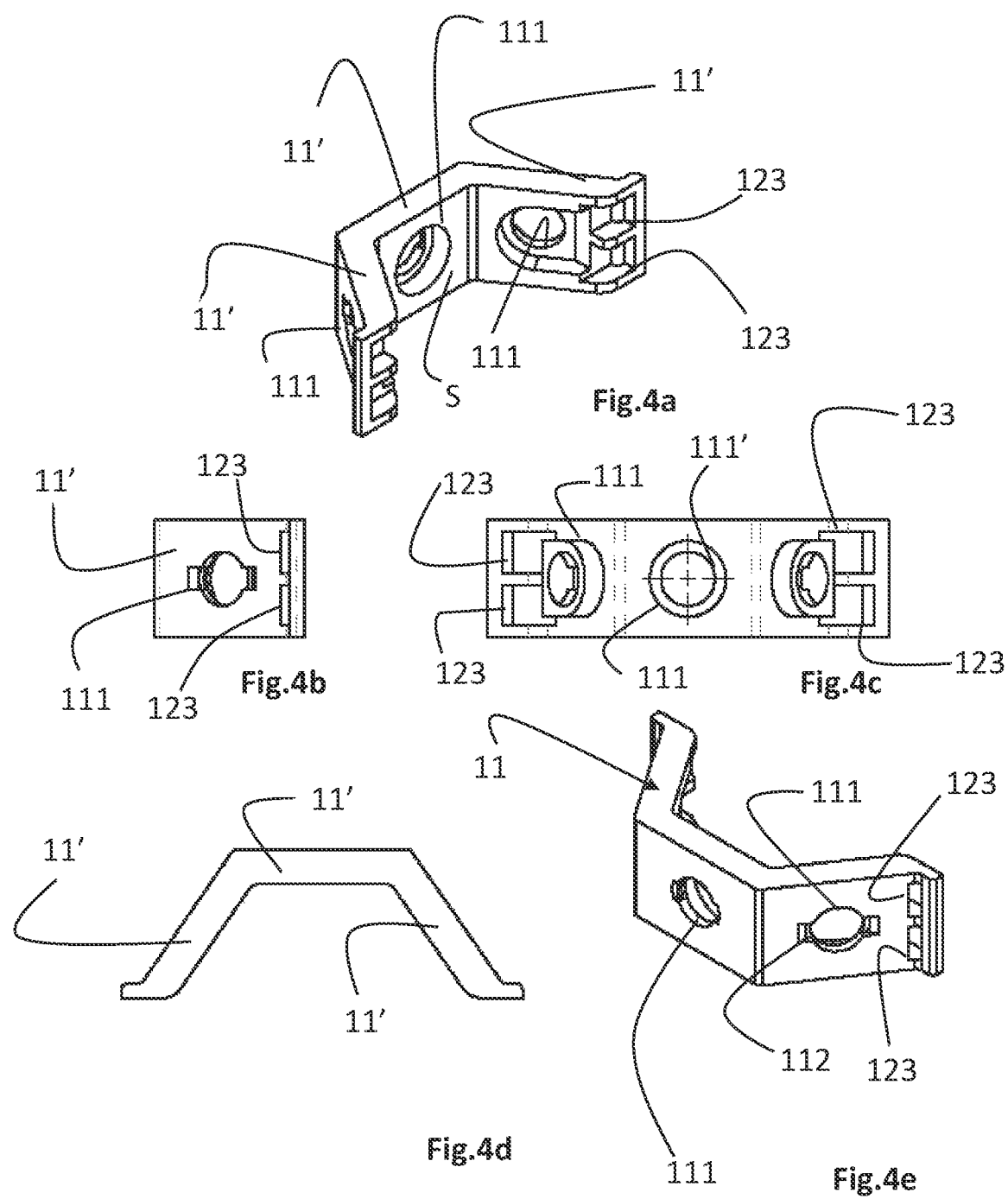

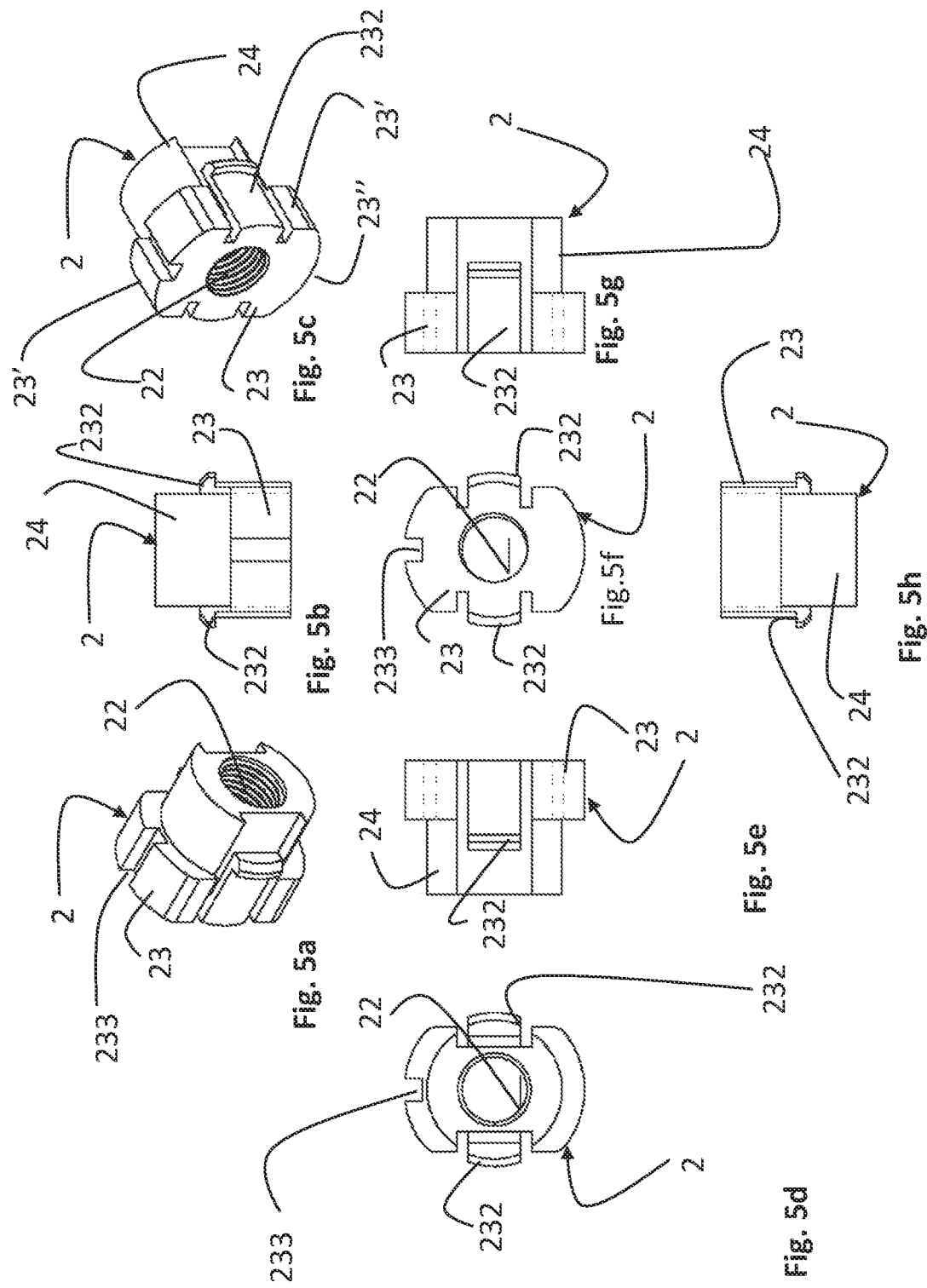

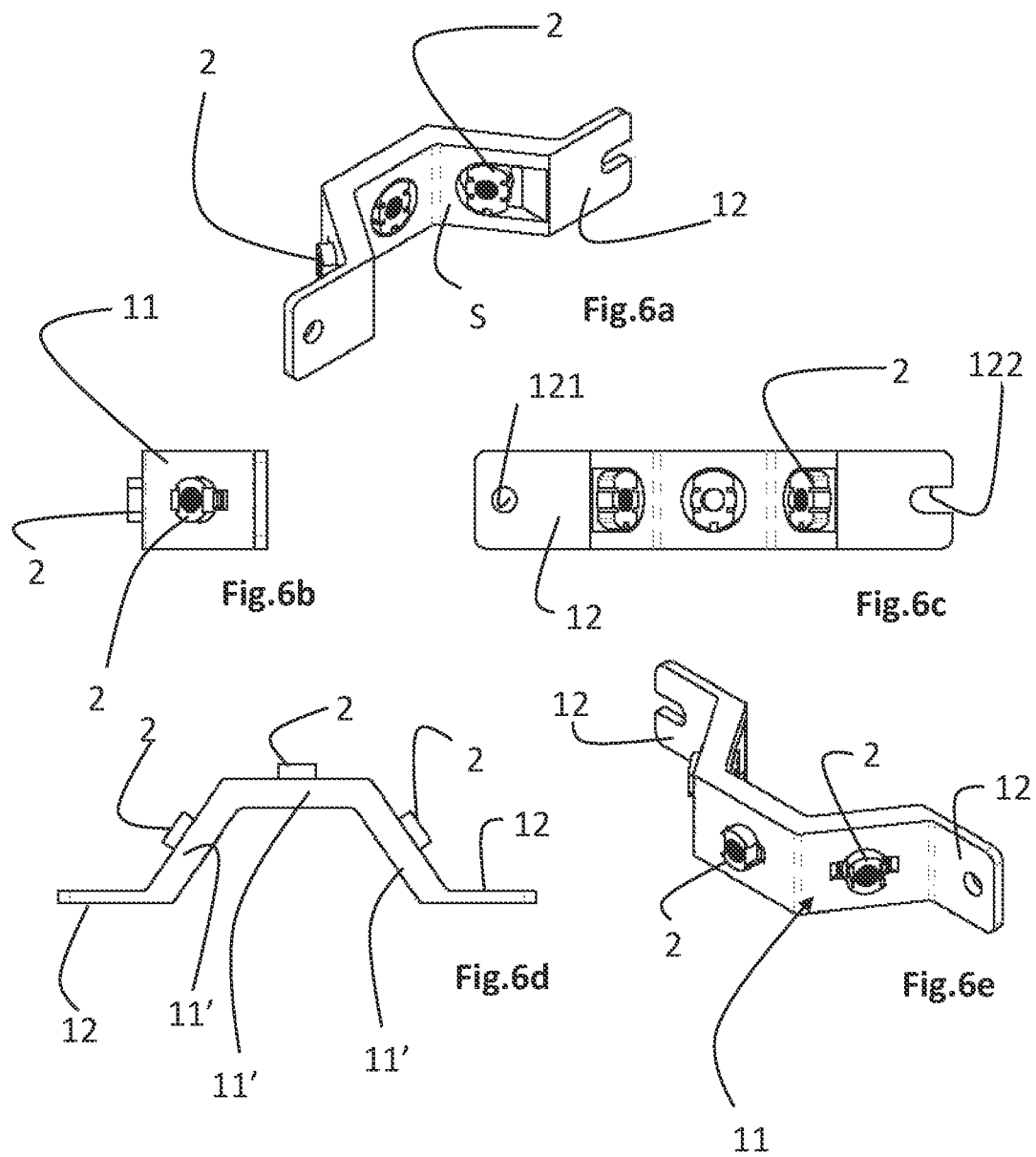

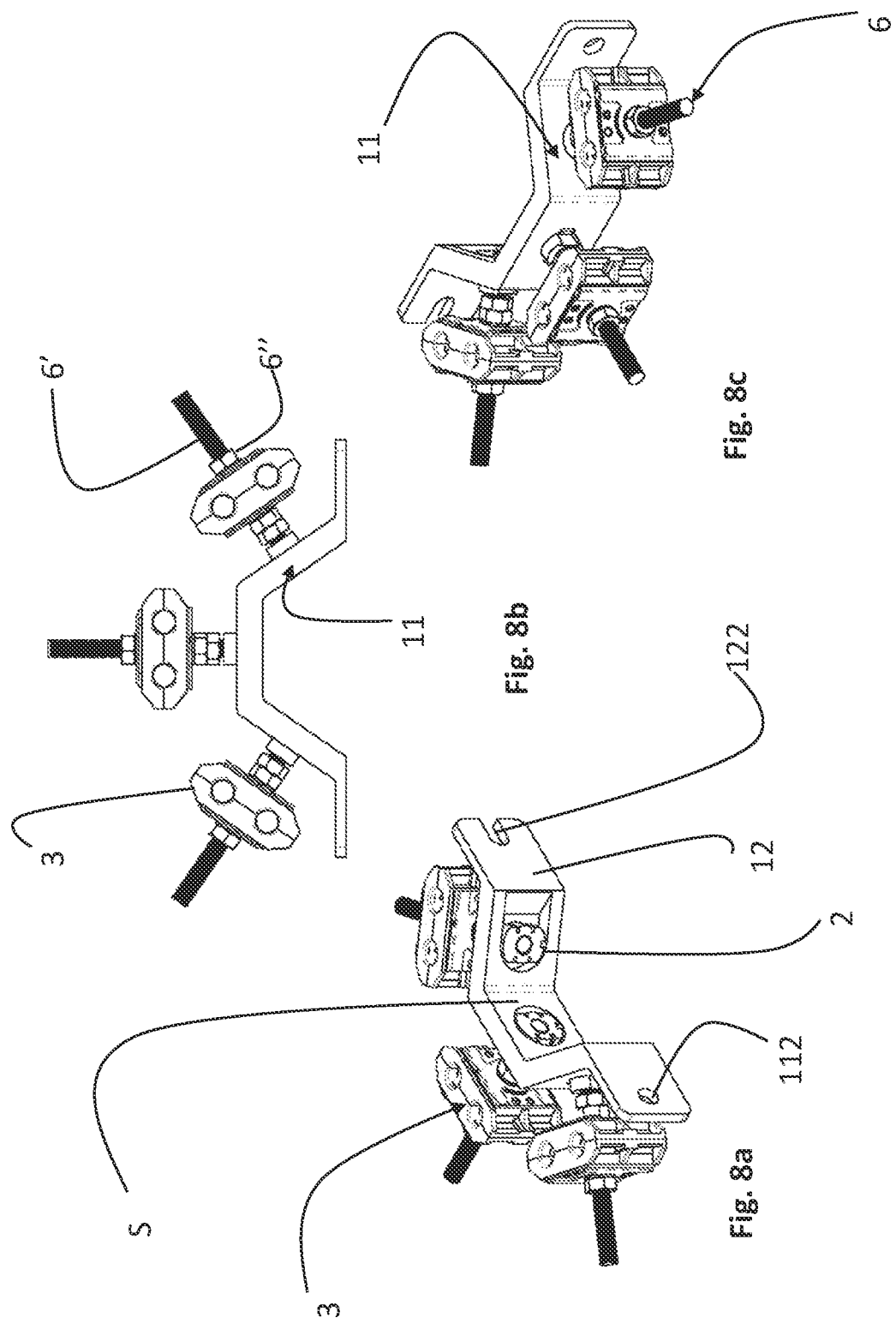

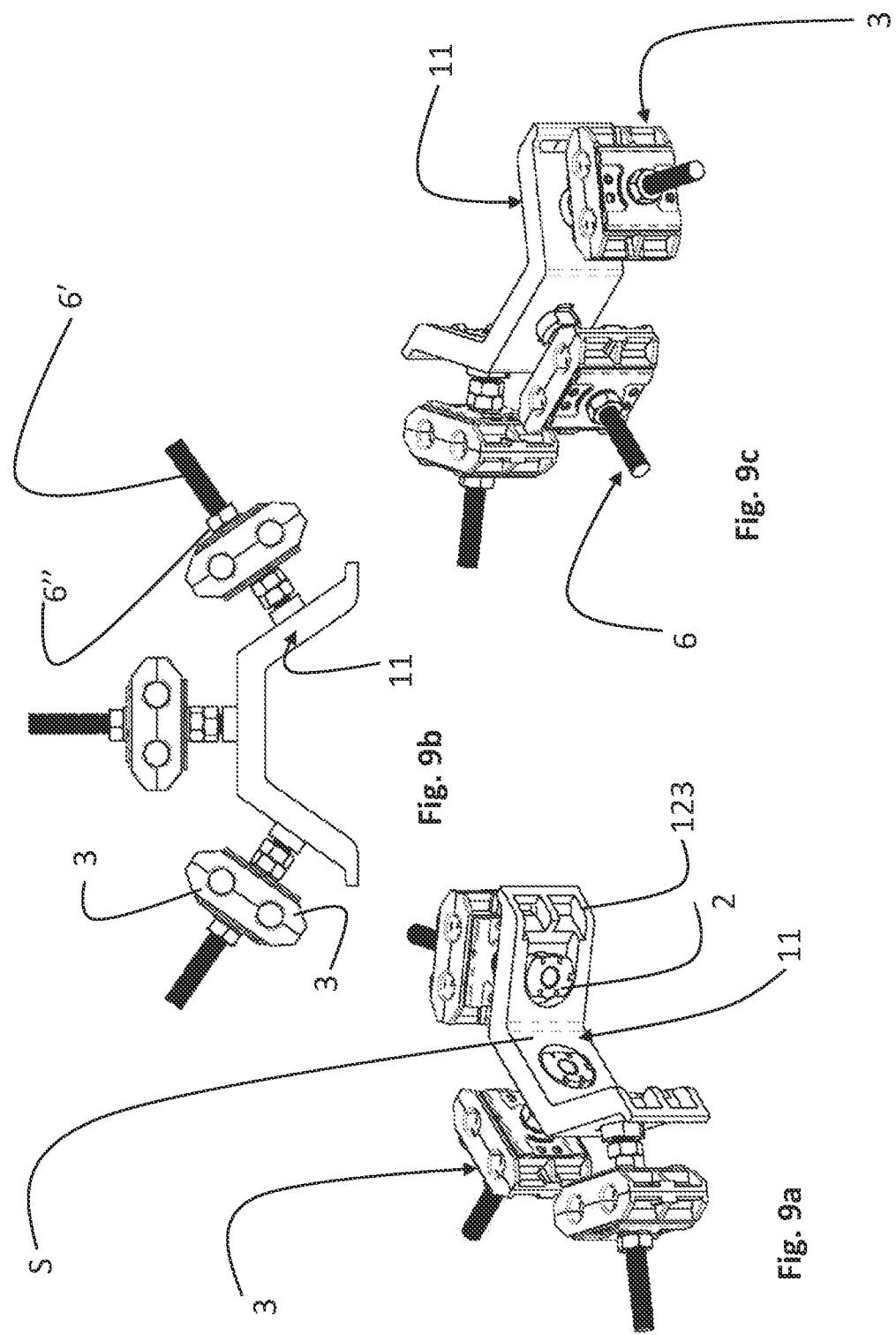

POLE COLLAR FOR MOUNTING CABLES TO A SUPPORTING ELEMENT

FIELD OF THE INVENTION

The present invention relates to an improved pole collar for mounting cables, for example coaxial cables, optical-fiber cables or power cables, to a supporting element, for example a pole.

BACKGROUND OF THE INVENTION

Pole collars are known for this purpose, which consist of a pair of jumpers or brackets coupled together, around a pole, by means of bolts or by an open circular element whose two ends can be connected to each other around the pole.

The seats of the cables, commonly called cable clamps (supporting collars for cables) or saddles are fixed to these brackets externally.

An example of these saddles is described in document WO2017/060199 whereas an example of said cable clamps is described in patent EP 2464907.

The bracket of the known pole collar made of steel is provided with at least one hole for the installation of quick-coupling collars for supporting long-shaped articles, in particular cables, tubes and/or the like or for the installation of saddles by means of a threaded rod.

The negative impact of the passive intermodulation, or PIM (Passive Inter-Modulation) phenomenon on the infrastructure of mobile radio networks, is also known. Passive intermodulation substantially takes place when multiple radio frequency signals, coming from one or more radio base stations, mix together in a site that houses a cell, giving rise to a signal that contains a new set of frequencies.

Undesired signals due to passive intermodulation are generated due to some form of mechanical non-linearity. One of the major causes is the inconsistency of the contacts between metal and metal in the areas affected by high current intensities, such as those inside the transmission lines or within the radio frequency (RF) components. This may be due to the imperfect preparation of the RF terminations or because of poor assembly procedures, the loosening of screws or rivets inside the RF components, contaminated or oxidized surfaces of the connectors or from inadequately tightened RF connectors.

Passive intermodulation can therefore potentially significantly degrade the service quality of new networks, such as Lte (Long Term Evolution) and Hdspa+(High Speed Downlink Packet Access), and it is of primary importance for telecommunications operators to reduce the negative effects of passive intermodulation in order to be able to install more advanced network infrastructures capable of supporting the conveyance of broadband data, without significantly increasing costs and without jeopardizing the performance level.

SUMMARY OF THE INVENTION

The objective of the present invention is to provide an improved pole collar for the mounting of cables capable of solving the negative impact of the passive intermodulation, or Pim (Passive Inter-Modulation) phenomenon.

A further objective of the invention is to provide a pole collar for mounting cables to a supporting element whose collar is sturdy and durable.

Another objective of the invention is to provide a pole collar that is extremely simple and inexpensive to produce, light, and not subject to rapid wear due to atmospheric agents.

The above-mentioned objectives are achieved by a pole collar, which may be embodied as set forth in the following description.

BRIEF DESCRIPTION OF THE DRAWINGS

The structural and functional characteristics of the present invention and its advantages with respect to the known art will be even more apparent from an examination of the following description, referring to the attached drawings, which illustrate examples of possible embodiments of the pole collar itself. In the drawings:

FIGS. 3a-3e are different views of the pole collar according to a first embodiment of the present invention, without an insert;

FIGS. 4a-4e are different views of the pole collar according to a second embodiment of the present invention, without an insert;

FIGS. 5a-5h are views of the threaded insert (adapter) of the pole collar according to the present invention;

FIGS. 6a-6e are different views of the pole collar according to a first embodiment of the present invention, provided with an insert;

FIGS. 8a-8c are different views of the pole collar according to a first embodiment of the present invention, provided with an insert and with the addition of saddles, connected to said pole collar by means of threaded rods;

FIGS. 9a-9c are different views of the pole collar according to a second embodiment of the present invention, provided with an insert and with the addition of saddles, connected to said pole collar by means of threaded rods;

DETAILED DESCRIPTION OF EMBODIMENTS OF THE INVENTION

Figure 2:
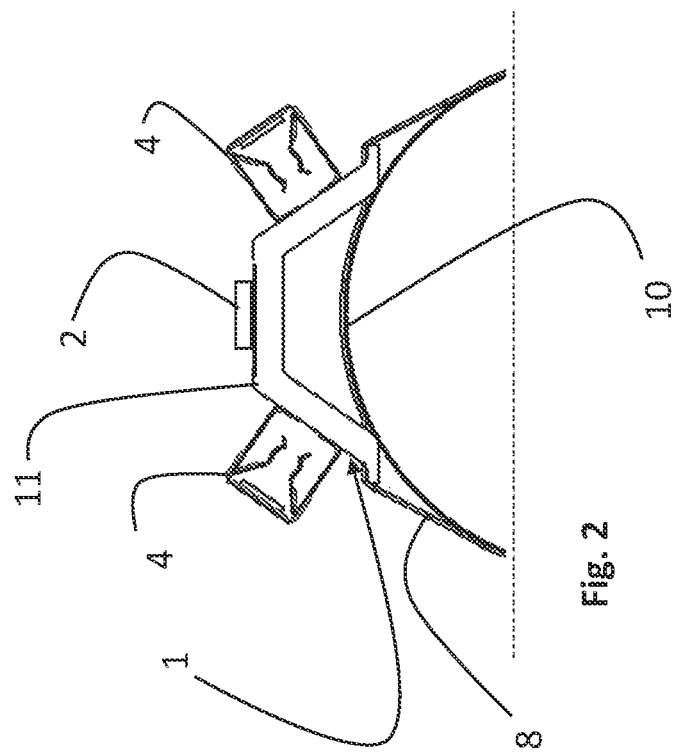
FIG. 2 is a view from above of the pole collar according to a second embodiment of the present invention with a bracket installed on a pole by means of cable ties, the supporting collars for cables being mounted on said pole collar.

A pole collar 1 according to the present invention consists of at least one bracket 11 provided with at least one pass-through hole 111, said at least one hole 111 being provided in combination with an insert or adapter 2 having a threaded pass-through hole 22.

Figure 1:
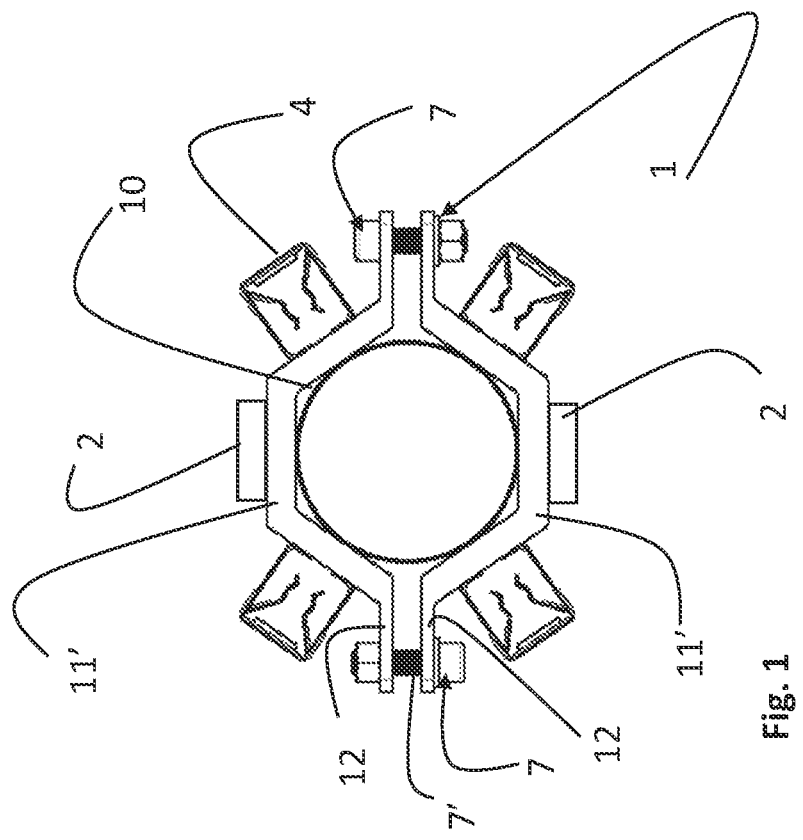
FIG. 1 shows a view from above of the pole collar according to a first embodiment of the present invention with a pair of brackets connected to each other by bolts around a pole, schematically illustrated, the supporting collars for cables being mounted on said pole collar.
Figure 7A:
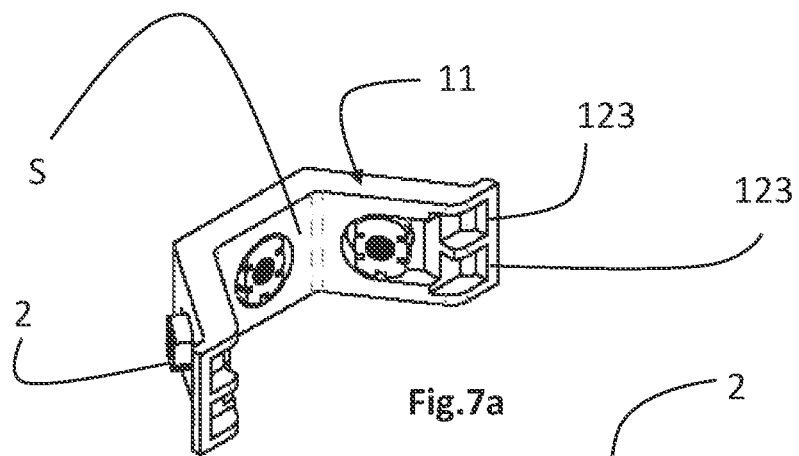
FIGS. 7a-7e are different views of the pole collar according to a second embodiment of the present invention, provided with an insert.
Figure 7B:
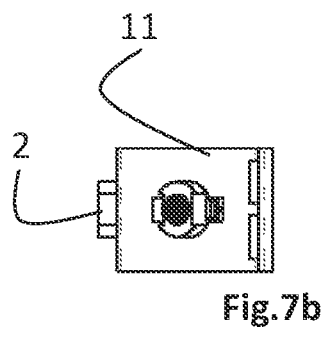
Figure 7C:
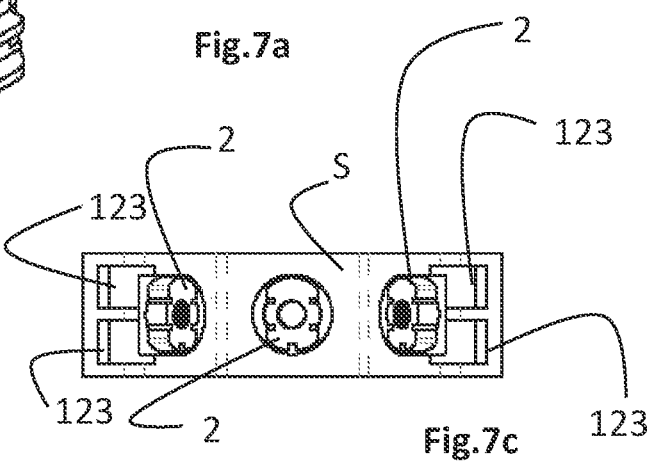
Figure 7D:
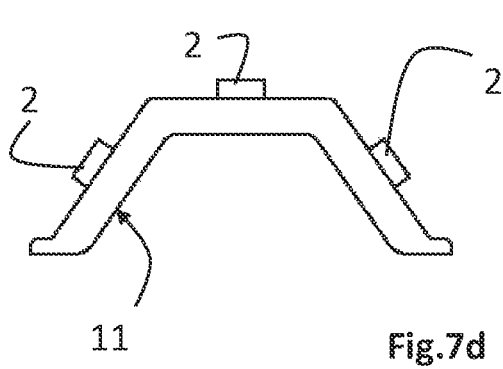
Figure 7E:
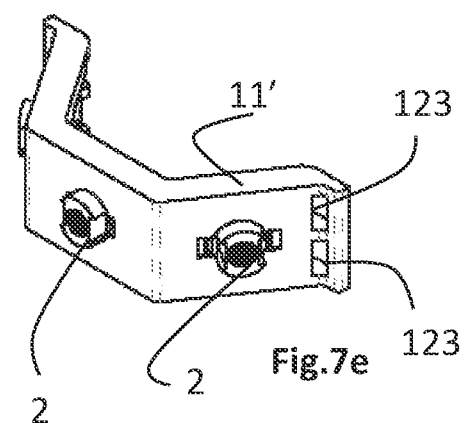

With reference to FIGS. 1 and 2 of the drawings, these illustrate a pole collar according to a first and a second embodiment of the present invention: in particular in FIG. 1 the pole collar, indicated as a whole by 1, is composed of two brackets or jumpers 11 bolted together, on which one or more quick-coupling collars 4 are installed for supporting long-shaped articles, in particular cables, tubes and/or the like (not shown) and an insert or adapter 2, as described hereunder, whereas FIG. 2 shows a pole collar 1 comprising a single bracket or jumper 11 fixed to a pole 10 by means of one, or preferably at least two, cable ties 8.

The pair of brackets 11 is preferably provided for mounting on poles 10 having reduced dimensions (about 100 mm in diameter) whereas the single bracket mounted with cable ties 8 is provided for mounting the collar 1 on tubular supports having larger dimensions.

According to a further embodiment not shown, the pole collar 1 can consist of an open ring or an openable circular bracket, which can be positioned around a pole 10 and the ends of said ring or bracket can be tightened together by means of bolts or cable ties so as to install said ring on said pole 10.

The bracket or jumper 11 of said pole collar 1 is composed of two or more flat sections 11' arranged on a circumference arc.

At least one of said sections 11' is provided with at least one pass-through hole 111.

In an embodiment, the ends of said bracket 11, in particular, in the embodiment illustrated, the peripheral sections 11' of which it is composed, are folded outwardly, with respect to said circumference arc, to form wings 12 which, cooperating with bolts 7 or cable ties 8, allow the positioning of said collar 1 on a pole 10.

As illustrated for example in FIG. 1, according to a first embodiment, the wings 12 of the bracket 11 have an open hole 121 and/or a slot 122 for the passage of the screws 7' of clamping bolts 7: for installing the collar 1 on the pole, the wings 12 of a pair of brackets 11 are positioned facing each other and tightened together by means of bolts 7.

In combination with or as an alternative to the holes 121, slots 122 and bolts 7, said wings 12 can be provided with at least one pass-through opening or slot 123 for the passage of at least one cable tie 8 through which the bracket 11 is tightened around the tubular support or pole 10.

In the embodiment illustrated in FIG. 2 and in FIGS. 4a-4e, the wings 12 are not provided but the ends of the bracket 11 have an edge folded outwardly, or a thickened edge, provided with one or more slots 123 for the passage of the cable ties 8 for tightening said bracket 11 around said tubular support or pole 10.

The non-limiting embodiments illustrated have a bracket 11 composed of three sections 11 each provided with a central hole 111.

According to an embodiment not shown, the two brackets 11 are hinged to each other at one end, and are tightened together at the other end by means of cable ties 8 or bolts 7 passing through holes 121 or slots 122.

At least one flat section 11' of said bracket 11 has at least one pass-through hole 111 and at least one of said pass-through holes 111 is provided in combination with an insert or adapter 2 having a pass-through threaded hole 22.

Said at least one pass-through hole 111 is in fact suitable for receiving a respective insert or adapter 2 with a threaded pass-through hole 22 or the coupling elements of a supporting collar 4 for cables, tubes or the like.

Figure 10:
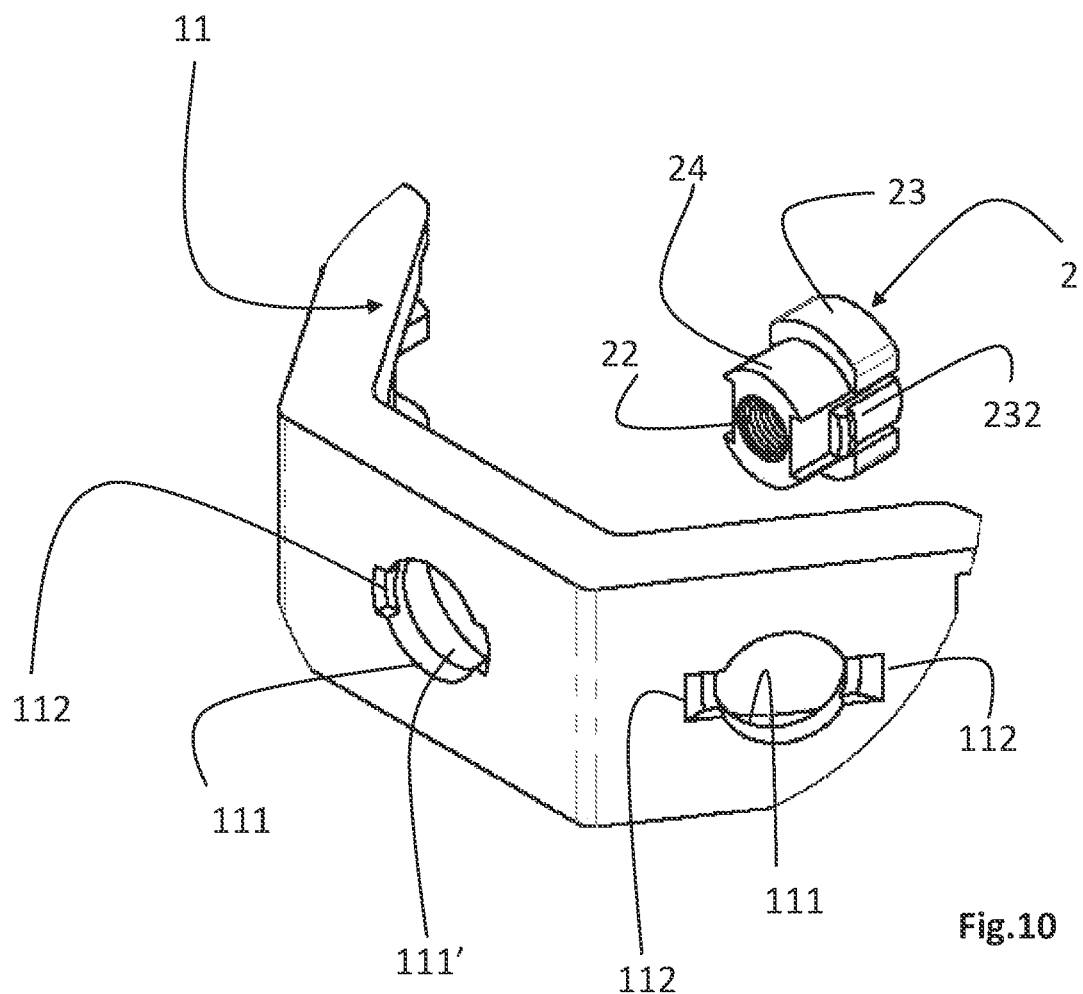
FIG. 10 illustrates a detail of the pole collar according to the present invention in which the hole and the threaded insert (adapter) are visible.

As is clearly illustrated in the figures, the pole collar 1, provided with seats 3 (so-called saddles, FIGS. 8a-8c, 9a-9c) for the passage of cables (not shown) or with quick-coupling collars 4 (FIGS. 7, 10, 11), is fixed to a tubular support, for example a pole 10.

The saddles 3 or the collars 4 for cables can be fixed to any of the sections 11' that form the bracket 11.

As illustrated in FIGS. 8a-8c 9a-9c, the seats/saddles 3 are fastened by means of a bolt (threaded rod/nut) 6 passing through the threaded pass-through hole 22 of the insert or adapter 2. The threaded rod is indicated by 6' and the nut with 6".

As illustrated in FIGS. 5a-5h, the insert or adapter 2 with a threaded pass-through hole 22 object of the present invention, comprises a substantially rectangular base section 23 with long straight sides 23' and short arched sides 23", a bush section 24 extending from said base section 23.

In the mounted condition of said insert or adapter 2 in at least one of said pass-through holes 111, said base section 23 is abutted against the internal surface S of the bracket 11 and the bush section 24 is at least partially inserted in the respective pass-through hole 111.

For pole collars 1 with a bracket 11 consisting of two or more flat sections 11', said base section 23 is abutted against the internal surface S of the sections 11' of the bracket 11.

According to an embodiment, a circular groove 111' is provided on the inner surface S of the bracket 11 around the pass-through hole 111, into which said base section 23 is at least partially inserted when the insert or adapter 2 is in a mounted condition on the bracket 11.

In a preferred embodiment said circular groove 111' has a depth which is such as to completely accommodate the base section 23 when the insert or adapter 2 is in a mounted condition on the bracket 11, i.e. the height of the circular groove 111' is at least equal to the height of the base section 23.

In this way, when the insert or adapter 2 is inserted in the hole 11, the base section 23 does not protrude beyond the internal surface S of the bracket 11 but is flush with it.

Respective elastically yielding teeth 232 extend from the straight long sides 23' of said base section 23 in the direction of the bush section 24, which are snap-engaged in respective undercuts 112 of said at least one pass-through hole 111 of the bracket 11 of the pole collar 1.

In this way, said at least one insert or adapter 2 is blocked in the corresponding hole 111 on the bracket 11 of the pole collar 1.

According to the present invention the pole collar 1 is made of plastic material reinforced with glass fibers.

From what is described above with reference to the figures, it is evident that the pole collar 1 according to the present invention is particularly useful and advantageous.

The objectives mentioned in the preamble of the description have thus been achieved.

In particular, the pole collar 1 made of plastic material reinforced with glass fibers has a resistance comparable to that of metal collars with the advantage of reducing the effect of PIM on the signals transmitted by the cables.

The pole collar 1 made of plastic material reinforced with glass fibers is sturdy, long-lasting, and guarantees easy and firm assembly on any type of tubular support.

Furthermore, the collar 1 according to the present invention guarantees resistance similar to the known metal collars but with the advantage of having a greater resistance to atmospheric agents and greater ease of assembly and disassembly, thanks to the fact that the material of which they are composed cannot be corroded.

Furthermore, the collar 1 object of the present invention can be easily produced in series.

The protection scope of the invention is thus defined by the enclosed claims.

The invention claimed is:
1. A pole collar configured to mount cables to a tubular support, comprising:
a bracket having at least one pass-through hole defined therein, and an insert or adapter having a threaded pass-through hole and configured to be engaged in the at least one pass-through hole, wherein the insert or adapter having the threaded pass-through hole comprises a substantially rectangular base section with straight sides and arched sides shorter than the straight sides, a bush section extending from the base section, wherein, in an assembled condition when the insert or adapter engages at least one of the pass-through holes, the base section is in abutment against an inner surface of the bracket and the bush section is at least partially inserted in the pass-through hole, and wherein a circular groove is defined on the inner surface of the bracket around the pass-through hole, into which the base section of the insert or adapter is at least partially inserted.

2. The pole collar according to claim 1, wherein the bracket comprises two or more flat sections disposed along a circumference arc, and wherein at least one of the flat sections has the at least one pass-through hole defined therein for engaging the insert or adapter.

3. The pole collar according to claim 1, wherein ends of the bracket extend outwardly to form wings, which, cooperating with bolts or cable ties, enable a positioning of the pole collar on the tubular support.

4. The pole collar according to claim 3, wherein the wings have an open hole or a slot configured for passage of a screw or a bolt clamping a first bracket with a second bracket so that the first and the second brackets are positioned to face each other and are clamped together around the tubular support with the screw or the bolt.

5. The pole collar according to claim 4, wherein in combination with or as an alternative to the open hole, the slot, the screw, or the bolt, the wings have at least one pass-through opening or slot defined therein for passage of at least one cable tie, by which the bracket is tightened around the tubular support.

6. A pole collar configured to mount cables to a tubular support, comprising:

a bracket having at least one pass-through hole defined therein, and an insert or adapter having a threaded pass-through hole and configured to be engaged in the at least one pass-through hole, wherein ends of the bracket have an edge extended outwardly in a transverse direction with one or more slots defined therein for passage of cable ties so as to clamp the bracket around the tubular support.

7. The pole collar according to claim 1, wherein the pole collar is made of at least two brackets hinged together at one end.

8. The pole collar according to claim 1, wherein the bracket is shaped as a ring that is configured to be opened and positioned around the tubular support, and wherein ends of the ring are configured to be tightened together by bolts or cable ties.

9. The pole collar according to claim 1, wherein the circular groove has a depth dimensioned to completely accommodate the base section of the insert or adapter in the assembled condition.

10. The pole collar according to claim 1, further comprising elastically yielding teeth that extend toward the bush section from the straight sides of the base section, the elastically yielding teeth snap-engaging in respective undercuts of the at least one pass-through hole.

11. The pole collar according to claim 1, wherein one of the pass-through holes has coupling elements of a supporting collar or cables or tubular elements inserted therein.

12. The pole collar according to claim 1, wherein a threaded rod of a bolt for fixing seats or saddles, for passage of cables, is screwed into the threaded pass-through hole of the insert or adapter engaged in one of the pass-through holes.

13. The pole collar according to claim 1, wherein the pole collar and the insert or adapter are made of a plastic material reinforced with glass fibers.

* * * * *